United States Patent
Tsuji (10) Patent No.: US 11,104,342 B2
(45) Date of Patent: Aug. 31, 2021

(54) VEHICLE CONTROL DEVICE, VEHICLE, AND VEHICLE CONTROL METHOD

(71) Applicant: HONDA MOTOR CO., LTD., Tokyo (JP)

(72) Inventor: Kanta Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 16/788,360

(22) Filed: Feb. 12, 2020

(65) Prior Publication Data
US 2020/0262435 A1   Aug. 20, 2020

(30) Foreign Application Priority Data

Feb. 15, 2019   (JP) .............................. JP2019-025841

(51) Int. Cl.
*B60W 30/00*   (2006.01)
*B60W 30/18*   (2012.01)

(52) U.S. Cl.
CPC . *B60W 30/18163* (2013.01); *B60W 2510/244* (2013.01); *B60W 2540/215* (2020.02)

(58) Field of Classification Search
None
See application file for complete search history.

(56) References Cited

U.S. PATENT DOCUMENTS

| | | | |
|---|---|---|---|
| 10,042,359 B1 * | 8/2018 | Konrardy | B60R 25/10 |
| 10,836,394 B2 * | 11/2020 | Kim | B60W 30/085 |
| 10,843,710 B2 * | 11/2020 | Seo | B60W 50/082 |
| 10,991,242 B2 * | 4/2021 | Taylor | G05D 1/0285 |
| 2009/0157289 A1 * | 6/2009 | Graessley | G01C 21/3682 |
| | | | 701/123 |
| 2010/0198508 A1 * | 8/2010 | Tang | G01C 21/3469 |
| | | | 701/414 |
| 2014/0379183 A1 * | 12/2014 | Long | B60L 53/305 |
| | | | 701/22 |
| 2015/0247734 A1 * | 9/2015 | Okada | G01C 21/3469 |
| | | | 701/423 |
| 2016/0349075 A1 * | 12/2016 | Son | G01C 21/3697 |

(Continued)

FOREIGN PATENT DOCUMENTS

| JP | 2000-018956 A | 1/2000 |
|---|---|---|
| JP | 2005-004442 A | 1/2005 |

(Continued)

OTHER PUBLICATIONS

Office Action dated Dec. 1, 2020 issued over the corresponding Japanese Patent Application No. 2019-025841 with the English translation thereof.

*Primary Examiner* — Jonathan M Dager
(74) *Attorney, Agent, or Firm* — Carrier Blackman & Associates, P.C.; Joseph P. Carrier; William D. Blackman (57) ABSTRACT

A vehicle control device is equipped with a remaining energy amount determination unit that determines a remaining energy amount of a host vehicle, and a lane change control unit that controls a lane change on the basis of the remaining energy amount. In the case that the remaining energy amount is less than a threshold value, the lane change control unit permits a first lane change, which is a lane change into a first lane located on one side of a host vehicle lane, and restricts a second lane change, which is a lane change into a second lane located on another side of the host vehicle lane.

7 Claims, 7 Drawing Sheets

(56) References Cited

U.S. PATENT DOCUMENTS

| | | | | |
|---|---|---|---|---|
| 2017/0313313 A1* | 11/2017 | Asakura | ............... | B60W 30/12 |
| 2018/0143029 A1* | 5/2018 | Nikulin | .............. | G01C 21/3697 |
| 2018/0238698 A1* | 8/2018 | Pedersen | ............ | G01C 21/3492 |
| 2020/0160709 A1* | 5/2020 | Ramot | ................. | G06Q 10/109 |
| 2020/0290619 A1* | 9/2020 | Mehdi | ................ | B60W 60/0011 |

FOREIGN PATENT DOCUMENTS

| | | |
|---|---|---|
| JP | 2009-274594 A | 11/2009 |
| JP | 2015-033258 A | 2/2015 |
| JP | 2017-197150 A | 11/2017 |

\* cited by examiner

VEHICLE CONTROL DEVICE, VEHICLE, AND VEHICLE CONTROL METHOD

CROSS-REFERENCE TO RELATED APPLICATION

This application is based upon and claims the benefit of priority from Japanese Patent Application No. 2019-025841 filed on Feb. 15, 2019, the contents of which are incorporated herein by reference.

BACKGROUND OF THE INVENTION

Field of the Invention

The present invention relates to a vehicle control device, a vehicle, and a vehicle control method.

Description of the Related Art

In Japanese Laid-Open Patent Publication No. 2017-197150, it is disclosed that a lane change by way of automated driving is prohibited in the case that a remaining energy amount of a host vehicle is insufficient.

SUMMARY OF THE INVENTION

However, there is a long awaited need for a vehicle control device which is capable of more accurately controlling a vehicle in accordance with a remaining energy amount of the host vehicle.

An object of the present invention is to provide a vehicle control device, a vehicle, and a vehicle control method, which are capable of more accurately controlling a vehicle in accordance with the remaining energy amount of the host vehicle.

A vehicle control device according to one aspect of the present invention comprises a remaining energy amount determination unit configured to determine a remaining energy amount of a host vehicle, and a lane change control unit configured to control a lane change on a basis of the remaining energy amount determined by the remaining energy amount determination unit, wherein, in a case that the remaining energy amount is determined by the remaining energy amount determination unit to be less than a threshold value, the lane change control unit permits a first lane change, which is the lane change into a first lane located on one side of a host vehicle lane, which is a lane in which the host vehicle travels, and restricts a second lane change, which is the lane change into a second lane located on another side of the host vehicle lane.

A vehicle according to another aspect of the present invention comprises the vehicle control device as described above.

A vehicle control method according to still another aspect of the present invention comprises a step of determining a remaining energy amount of a host vehicle, and a step of controlling a lane change on a basis of the remaining energy amount, wherein, in a case it is determined in the step of determining the remaining energy amount that the remaining energy amount is less than a threshold value, then in the step of controlling the lane change, a first lane change, which is the lane change into a first lane located on one side of a host vehicle lane, which is a lane in which the host vehicle travels, is permitted, and a second lane change, which is the lane change into a second lane located on another side of the host vehicle lane, is restricted.

According to the present invention, it is possible to provide a vehicle control device, a vehicle, and a vehicle control method, which are capable of more accurately controlling a vehicle in accordance with the remaining energy amount of the host vehicle.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a vehicle control device, a vehicle, and a vehicle control method according to the present invention will be presented and described in detail below with reference to the accompanying drawings.

Embodiment

Figure 1:
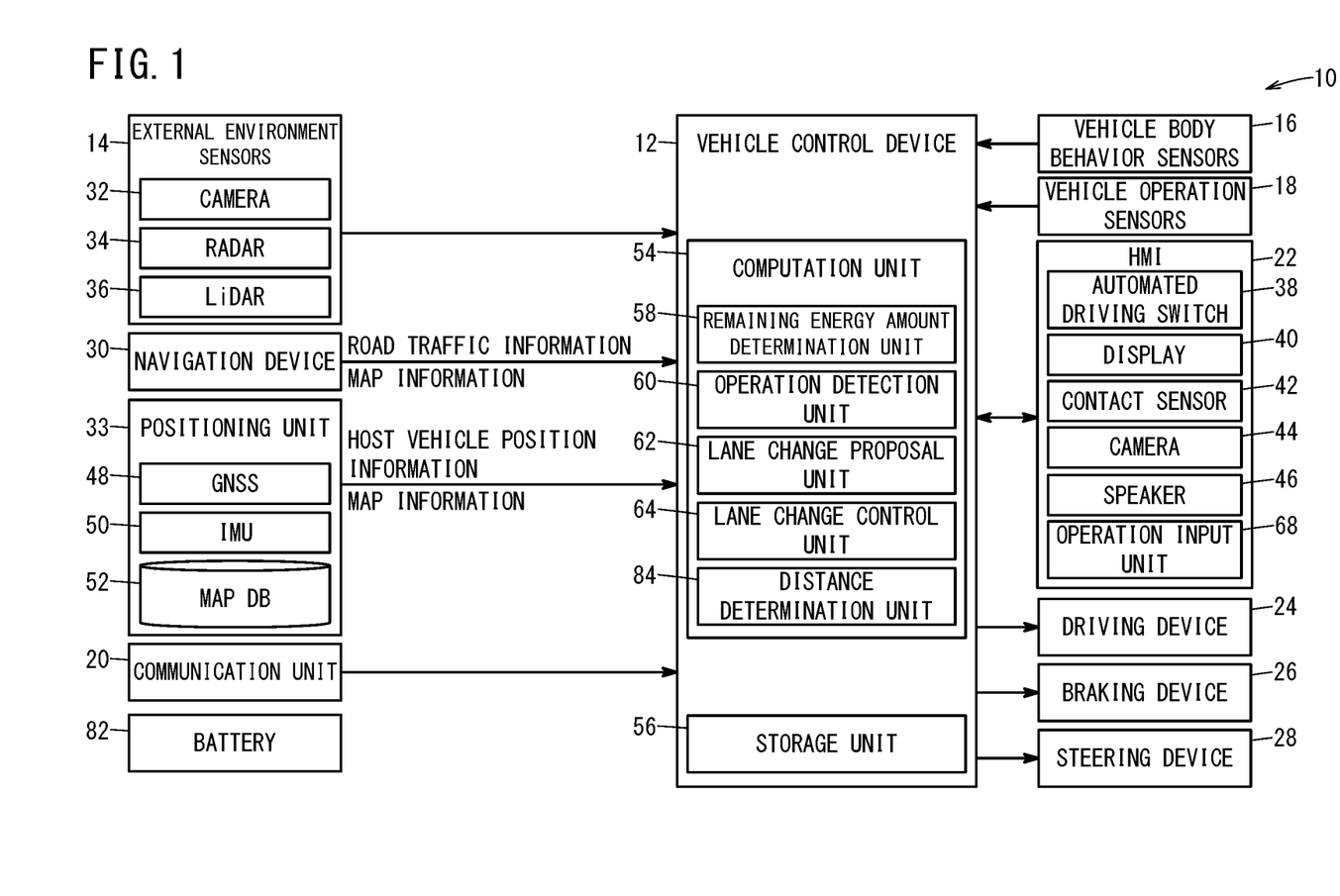
FIG. 1 is a block diagram showing a vehicle according to an embodiment of the present invention.

A vehicle control device, a vehicle, and a vehicle control method according to embodiments of the present invention will be described with reference to the drawings. FIG. 1 is a block diagram showing a vehicle according to the present embodiment.

A vehicle (host vehicle) 10 is equipped with a vehicle control device 12, namely, a vehicle control ECU (Electronic Control Unit). The vehicle 10 is further equipped with external environment sensors 14, vehicle body behavior sensors 16, vehicle operation sensors 18, a communication unit 20, and an HMI (Human Machine Interface) 22. The vehicle 10 is further equipped with a driving device 24, a braking device 26, a steering device 28, a navigation device 30, a positioning unit 33, and a battery 82. Although the vehicle 10 is equipped with other constituent elements apart from those noted above, description of such elements is omitted herein. In this instance, although an exemplary case is described in which the vehicle 10 is an electric vehicle that is capable of being operated using the energy stored in the battery 82, the present invention is not limited to this feature.

The external environment sensors 14 acquire external environmental information, that is, peripheral information around the vicinity of the vehicle 10. The external environment sensors 14 include a plurality of cameras 32 and a plurality of radar devices 34. Among the external environment sensors 14, there are further included a plurality of LiDAR (Light Detection And Ranging, Laser Imaging Detection and Ranging) devices 36.

Information acquired by the cameras (imaging units) 32, i.e., camera information, is supplied from the cameras 32 to the vehicle control device 12. As such camera information, there may be cited captured image information and the like. The camera information, together with radar information and LiDAR information to be described later, makes up the external environmental information. Although a single camera 32 is illustrated in FIG. 1, a plurality of cameras 32 are actually provided.

The radar devices 34 emit transmitted waves toward the exterior of the vehicle 10, and receive reflected waves that are reflected and returned by detected objects. As examples of the transmitted waves, there may be cited electromagnetic waves. As examples of the electromagnetic waves, there may be cited millimeter waves. As examples of the detected objects, there may be cited another vehicle 76 or the like including a preceding vehicle (see FIG. 2). The radar devices 34 generate radar information (reflected wave signals) based on the reflected waves or the like. The radar devices 34 supply the generated radar information to the vehicle control device 12. Although one radar device 34 is illustrated in FIG. 1, a plurality of radar devices 34 are actually provided in the vehicle 10. Moreover, the radar devices 34 are not limited to using millimeter wave radar. For example, laser radar devices, or ultrasonic sensors or the like may be used as the radar devices 34.

The LiDAR devices 36 continuously irradiate lasers in all directions of the vehicle 10, measure the three dimensional positions of reflection points based on reflected waves of the emitted lasers, and output information, i.e., three dimensional information, in relation to the three dimensional positions. The LiDAR devices 36 supply the three dimensional information, i.e., LiDAR information, to the vehicle control device 12. Although one LiDAR device 36 is illustrated in FIG. 1, a plurality of LiDAR devices 36 are actually provided in the vehicle 10.

The vehicle body behavior sensors 16 acquire information, namely, vehicle body behavior information, in relation to the behavior of the vehicle 10. The vehicle body behavior sensors 16 include a non-illustrated vehicle speed sensor, non-illustrated vehicle wheel speed sensors, a non-illustrated acceleration sensor, and a non-illustrated yaw rate sensor. The vehicle speed sensor detects the speed, i.e., the vehicle speed, of the vehicle 10. Further, the vehicle speed sensor detects the direction in which the vehicle 10 is traveling. The vehicle wheel speed sensors detect the speed, i.e., the vehicle wheel speed, of the non-illustrated vehicle wheels. The acceleration sensor detects the acceleration of the vehicle 10. The term "acceleration" includes a longitudinal acceleration, a lateral acceleration, and a vertical acceleration. It should be noted that the acceleration of only a portion of the aforementioned directions may be detected by the acceleration sensor. The yaw rate sensor detects a yaw rate of the vehicle 10.

The vehicle operation sensors (driving operation sensors) 18 acquire information, namely, driving operation information, in relation to driving operations made by a user (driver). The vehicle operation sensors 18 include a non-illustrated accelerator pedal sensor, a non-illustrated brake pedal sensor, a non-illustrated steering angle sensor, and a non-illustrated steering torque sensor. The accelerator pedal sensor detects an operated amount of a non-illustrated accelerator pedal. The brake pedal sensor detects an operated amount of a non-illustrated brake pedal. The steering angle sensor detects the steering angle of a non-illustrated steering wheel. The torque sensor detects a torque applied to the steering wheel.

The communication unit 20 performs wireless communications with non-illustrated external equipment. The external equipment may include, for example, a non-illustrated external server. The communication unit 20 may be capable of being detached from the vehicle 10, or may be non-detachable with respect to the vehicle. As examples of the communication unit 20 that can be attached to and detached from the vehicle 10, there may be cited a mobile phone and a smartphone.

The HMI 22 accepts an operation input made by the user (vehicle occupant), and provides various types of information to the user in a visual, audible, or tactile manner. The HMI 22 includes, for example, an automated driving switch (driving assist switch) 38, a display 40, a contact sensor 42, a camera 44, a speaker 46, and an operation input unit 68.

The automated driving switch 38 is used by the user in order to instruct starting or stopping of automated driving. The automated driving switch 38 includes a non-illustrated start switch and a non-illustrated stop switch. The start switch outputs a start signal to the vehicle control device 12 in accordance with an operation of the user. The stop switch outputs a stop signal to the vehicle control device 12 in accordance with an operation of the user.

The display (display unit) 40 includes, for example, a liquid crystal panel or an organic EL panel or the like. In this instance, although an exemplary case will be described in which the display 40 is a touch panel, the present invention is not limited to this feature.

The contact sensor 42 serves to detect whether or not the user (driver) is touching the steering wheel. Signals output from the contact sensor 42 are supplied to the vehicle control device 12. On the basis of input signals supplied from the contact sensor 42, the vehicle control device 12 is capable of determining whether or not the user is touching the steering wheel.

The camera 44 captures images of the interior, i.e., a non-illustrated vehicle compartment interior, of the vehicle 10. The camera 44 may be disposed, for example, on a non-illustrated dashboard, or may be disposed on a non-illustrated ceiling of the vehicle. Further, the camera 44 may be disposed in a manner so that images are captured of only the driver, or may be disposed in a manner so that images are captured of each of the vehicle occupants. The camera 44 outputs information, i.e., image information, which is acquired by capturing images of the vehicle compartment interior, to the vehicle control device 12.

The speaker 46 serves to provide various types of information to the user by way of sound or voice. The vehicle control device 12 outputs various notifications, alarms, or the like using the speaker 46.

The operation input unit 68 is a device by which the user performs an operation input in order to instruct a lane change. Further, in the case that a proposal for making a lane change, or in other words, a lane change proposal is issued by the vehicle control device 12, the user may perform, using the operation input unit 68, an indication of intention, which indicates whether or not the user agrees with the lane change proposal. The operation input unit 68, for example, is a non-illustrated lever-shaped operating element; however, the present invention is not limited to this feature. The operation input unit 68 is provided, for example, on a non-illustrated steering column; however, the present invention is not limited to this feature. The operation input unit 68 can be turned clockwise and counterclockwise, for example, about a non-illustrated support shaft. The operation input unit 68 is equipped with a non-illustrated operation position sensor. The operation position sensor detects operated positions of the operation input unit 68. The operation input unit 68 supplies information obtained by the operation position sensor, namely, information concerning the operated position of the operation input unit 68, to an operation detection unit 60, to be described later.

The driving device (driving force control system) 24 includes a non-illustrated drive ECU, and a non-illustrated drive source. By controlling the drive source, the drive ECU controls the driving force (torque) of the vehicle 10. As examples of the drive source, there may be cited a driving motor or the like; however, the present invention is not limited to this feature. An engine or the like may also be used as the drive source. The drive ECU is capable of controlling the driving force by controlling the drive source, based on an operation made by the user on the accelerator pedal. Further, the drive ECU is capable of controlling the driving force by controlling the drive source, based on a command supplied from the vehicle control device 12. The driving force of the drive source is transmitted to the non-illustrated vehicle wheels via a non-illustrated transmission.

The braking device (braking force control system) 26 includes a non-illustrated brake ECU, and a non-illustrated brake mechanism. The brake mechanism actuates a brake member by a brake motor, a hydraulic mechanism, or the like. The brake ECU is capable of controlling the braking force by controlling the brake mechanism, based on an operation made by the user on the brake pedal. Further, the brake ECU is capable of controlling the braking force by controlling the brake mechanism, based on a command supplied from the vehicle control device 12.

The steering device (steering system) 28 includes a non-illustrated steering ECU, and more specifically, an EPS (electric power steering system) ECU, and a non-illustrated steering motor. The steering ECU controls the direction of the vehicle wheels (steering wheels) by controlling the steering motor, based on an operation made by the user on the steering wheel. Further, the steering ECU controls the direction of the vehicle wheels by controlling the steering motor, based on a command supplied from the vehicle control device 12. Steering may be performed by changing the torque distribution and the braking force distribution to the left and right vehicle wheels.

The navigation device 30 is equipped with a non-illustrated GNSS (Global Navigation Satellite System) sensor. In addition, the navigation device 30 is further equipped with a non-illustrated computation unit and a non-illustrated storage unit. The GNSS sensor detects the current position of the vehicle 10. From a non-illustrated map database stored in the storage unit, the computation unit reads out map information corresponding to the current position detected by the GNSS sensor. Using the map information, the computation unit determines a target route from the current position to a destination. In this manner, the navigation device 30 is capable of functioning as a target route determination unit that determines in advance a target route to a destination. The destination is input by the user via the HMI 22. As described above, the display 40 is a touch panel. The destination is input by the touch panel being operated by the user. The navigation device 30 outputs the created target route to the vehicle control device 12. The vehicle control device 12 supplies the target route to the HMI 22. The HMI 22 displays the target route on the display 40. The navigation device 30 is capable of supplying the map information to the vehicle control device 12. Further, the navigation device 30 is capable of acquiring road traffic information. Such road traffic information can be supplied to the navigation device 30, for example, by an FM multiplex broadcast, beacons, or the like. Further, the navigation device 30 is capable of supplying the road traffic information to the vehicle control device 12.

The positioning unit 33 is equipped with a GNSS 48. The positioning unit 33 is further provided with an IMU (Inertial Measurement Unit) 50 and a map database (map DB) 52. The positioning unit 33 specifies the position of the vehicle 10 by appropriately using the information obtained by the GNSS 48, the information obtained by the IMU 50, and the map information stored in the map database 52. The positioning unit 33 is capable of supplying host vehicle position information, which is information indicative of the position of the host vehicle 10, to the vehicle control device 12. Further, the positioning unit 33 is capable of supplying the map information to the vehicle control device 12.

The vehicle control device 12 is equipped with a computation unit 54 and a storage unit 56. The computation unit 54 governs the overall control of the vehicle control device 12. The computation unit 54 is constituted, for example, by a CPU (Central Processing Unit). The computation unit 54 executes the vehicle control by controlling each of the respective units based on programs stored in the storage unit 56.

The computation unit 54 is equipped with a remaining energy amount determination unit 58, the operation detection unit 60, a lane change proposal unit 62, a lane change control unit 64, and a distance determination unit 84. The remaining energy amount determination unit 58, the operation detection unit 60, the lane change proposal unit 62, the lane change control unit 64, and the distance determination unit 84 can be realized by the computation unit 54 executing programs which are stored in the storage unit 56.

Figure 2:
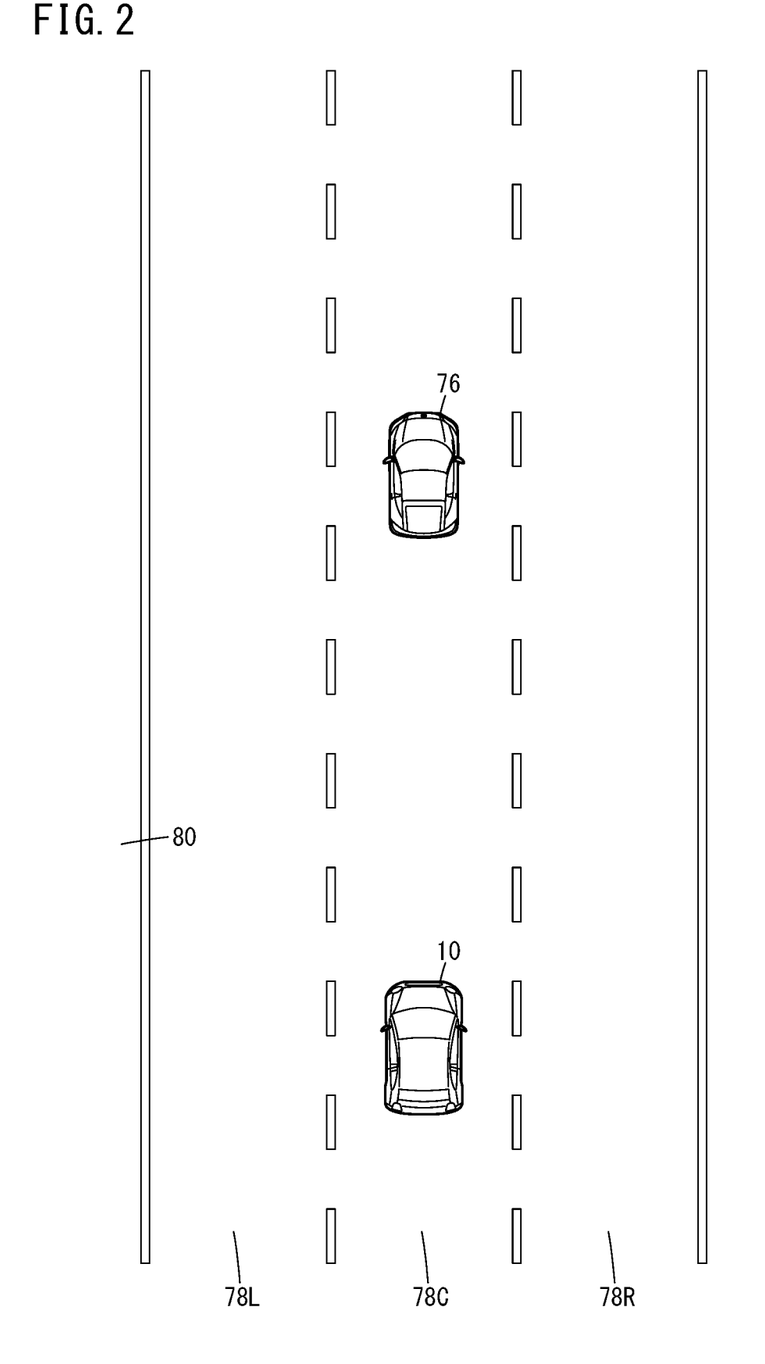
FIG. 2 is a view showing an example of a travel lane.
Figure 3:
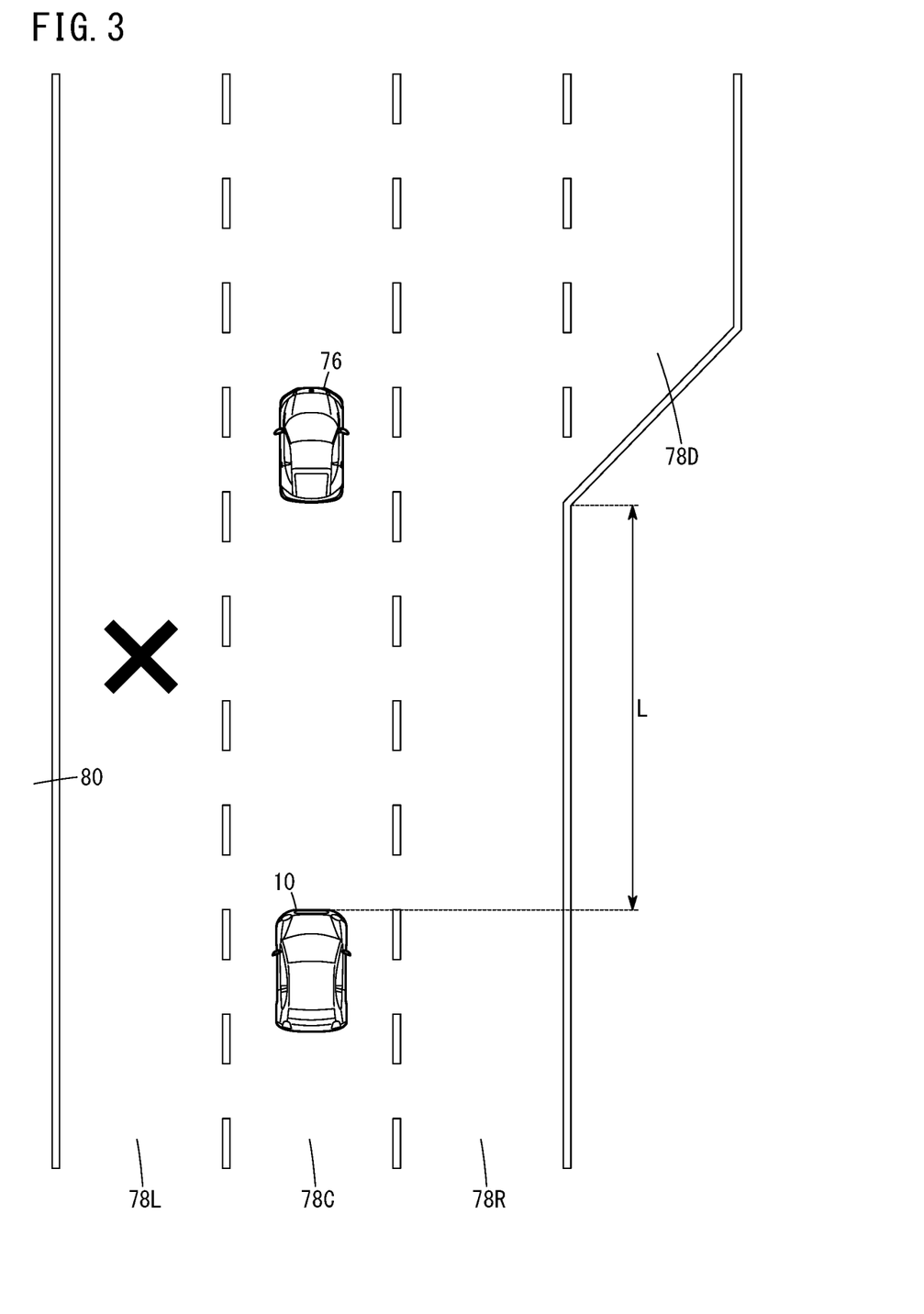
FIG. 3 is a view showing an example of a travel lane.

FIGS. 2 and 3 are views showing examples of a travel lane. In FIGS. 2 and 3, exemplary cases are shown in which the host vehicle 10 and the other vehicle 76 are traveling in a lane (host vehicle lane) 78C. A lane 78L is an adjacent lane located on a left side of the lane 78C, and a lane 78R is an adjacent lane located on a right side of the lane 78C. A lane 78D shown in FIG. 3 is a branching lane (branching road) that leads to the destination, or in other words, a branching lane that is located on the target route. Moreover, as noted previously, the target route can be determined in advance by the user operating the navigation device 30, for example. The lane 78R is located between the lane 78D and the lane 78C. An evacuation area 80, specifically, a road shoulder is located on the left side of the lane 78L. In the case that the remaining energy amount of the host vehicle 10 is about to become zero, the host vehicle 10 can retreat into the evacuation area 80. It should be noted that, when describing the lanes in general, the reference numeral 78 is used, and when describing individual lanes, the reference numerals 78C, 78D, 78L, and 78R are used. In FIG. 2, an exemplary case is illustrated in which the lane 78R is not a lane that is located on the target route. In FIG. 3, an exemplary case is illustrated in which the lanes 78R and 78D are lanes that are located on the target route. In this instance, although cases are shown in which the other vehicle 76 is located in front of the host vehicle 10, the other vehicle 76 need not necessarily be located in front of the host vehicle 10. Moreover, in this instance, although an exemplary case is described in which the evacuation area 80 is located on the left side of the lane 78L, the present invention is not limited to this feature.

The remaining energy amount determination unit 58 is capable of determining the remaining energy amount of the host vehicle 10, which for example, is the remaining energy amount that is stored in the battery 82. The battery 82 is equipped with a non-illustrated voltage sensor, a non-illustrated temperature sensor, and a non-illustrated current sensor. Signals output respectively from the sensors provided in the battery 82 are supplied to the vehicle control device 12. On the basis of such signals supplied from the battery 82, the remaining energy amount determination unit 58 determines a state of charge (SOC) of the battery 82. More specifically, on the basis of such signals supplied from the battery 82, the remaining energy amount determination unit 58 determines the remaining energy amount (electrical power) maintained by the battery 82. In this manner, the remaining energy amount determination unit 58 is capable of determining the remaining energy amount of the host vehicle 10. The remaining energy amount determination unit 58 is capable of determining whether or not the remaining energy amount of the host vehicle 10 is greater than or equal to a threshold value. Moreover, in this instance, although an exemplary case is described in which the remaining energy amount determination unit 58 determines the remaining energy amount maintained by the battery 82, the present invention is not limited to this feature. In the case that the host vehicle 10 is capable of being operated by a fuel such as gasoline or the like, the remaining energy amount of the host vehicle 10 can be determined, for example, on the basis of a remaining fuel amount.

The lane change control unit 64 controls the lane change of the host vehicle 10 on the basis of the remaining energy amount determined by the remaining energy amount determination unit 58. In the case it is determined by the remaining energy amount determination unit 58 that the remaining energy amount of the host vehicle 10 is less than the threshold value, the lane change control unit 64 performs a control in the following manner. More specifically, in such a case, the lane change control unit 64 permits a first lane change, which is a lane change into the lane (first lane) 78L located between the evacuation area 80 into which the host vehicle 10 can retreat, and the host vehicle lane 78C, which is a lane in which the host vehicle 10 travels. The reason why such a first lane change is permitted is because it becomes easy to enable evacuation of the host vehicle 10 into the evacuation area 80 when the remaining energy amount of the host vehicle 10 is about to become zero. On the other hand, in such a case, the lane change control unit 64 restricts a second lane change, which is a lane change into the lane (second lane) 78R that is not located between the evacuation area 80 and the host vehicle lane 78C. The reason why such a second lane change is restricted is because, if the lane change into the second lane 78R were performed, it would become difficult for the host vehicle 10 to retreat into the evacuation area 80 when the remaining energy amount of the host vehicle 10 is about to become zero. Another reason why the second lane change is restricted is because a second lane change made in such a manner results in energy being consumed needlessly, which is not preferable from the standpoint of energy conservation.

On the basis of signals supplied from the operation input unit 68, the operation detection unit 60 detects operation inputs performed by the user to the operation input unit 68. The operation detection unit 60 is capable of detecting a first operation input and a second operation input. The first operation input, for example, is an operation input for the purpose of instructing a lane change into an adjacent lane 78 located on the left side of the host vehicle lane 78. The first operation input can be performed, for example, by turning the operation input unit 68 counterclockwise; however, the present invention is not limited to this feature. The second operation input, for example, is an operation input for the purpose of instructing a lane change into an adjacent lane 78 located on the right side of the host vehicle lane 78. The second operation input can be performed, for example, by turning the operation input unit 68 clockwise; however, the present invention is not limited to this feature.

A description will be given with reference to FIG. 2 concerning an example of operations performed in the case that the second lane 78R is not a lane that is located on the target route. In the case it is determined by the remaining energy amount determination unit 58 that the remaining energy amount of the host vehicle 10 is less than the threshold value, the lane change control unit 64 can perform a control in the following manner. More specifically, in such a case, the lane change control unit 64 accepts the operation input for the purpose of making the first lane change. That is, in accordance with the operation input detected by the operation detection unit 60, the lane change control unit 64 permits the first lane change, namely, the lane change into the first lane 78L. The reason why such a first lane change is permitted is because it becomes easy to enable evacuation of the host vehicle 10 into the evacuation area 80 when the remaining energy amount of the host vehicle 10 is about to become zero. Further, in such a case, the lane change control unit 64 does not accept the operation input for the purpose of making the second lane change. Stated otherwise, in accordance with the operation input detected by the operation detection unit 60, the lane change control unit 64 restricts the second lane change, namely, the lane change into the second lane 78R. The reason why such a second lane change is restricted is because it would become difficult for the host vehicle 10 to retreat into the evacuation area 80 when the remaining energy amount of the host vehicle 10 is about to become zero. Another reason why the second lane change is restricted is because a second lane change made in such a manner results in energy being consumed needlessly, which is not preferable from the standpoint of energy conservation.

For example, in the case that an operation input to turn the operation input unit 68 counterclockwise is made when the host vehicle 10 is traveling in the lane 78C, the lane change corresponding to the operation input is a lane change into the lane 78L. In the case it is determined by the remaining energy amount determination unit 58 that the remaining energy amount of the host vehicle 10 is less than the threshold value, the lane change control unit 64 permits such a lane change. Stated otherwise, in such a case, the lane change control unit 64 executes the lane change.

For example, in the case that an operation input to turn the operation input unit 68 clockwise is made when the host vehicle 10 is traveling in the lane 78C, the lane change corresponding to the operation input is a lane change into the lane 78R. In the case it is determined by the remaining energy amount determination unit 58 that the remaining energy amount of the host vehicle 10 is less than the threshold value, the lane change control unit 64 restricts such a lane change. Stated otherwise, in such a case, the lane change control unit 64 does not execute the lane change.

A description will be given with reference to FIG. 2 concerning an example of operations performed in the case that the second lane 78R is a lane that is located on the target route. Even in the case it is determined by the remaining energy amount determination unit 58 that the remaining energy amount of the host vehicle 10 is less than the threshold value, if the second lane 78R is a lane located on the target route, the lane change control unit 64 can perform a control in the following manner. More specifically, in such a case, the lane change control unit 64 does not accept the operation input for the purpose of making the first lane change. That is, in accordance with the operation input detected by the operation detection unit 60, the lane change control unit 64 restricts the first lane change, namely, the lane change into the first lane 78L. The reason why the first lane change is restricted in this case is because, since the first lane 78L is not a lane located on the target route, such a lane change would result in energy being consumed needlessly, which is not preferable from the standpoint of energy conservation. Further, in such a case, the lane change control unit 64 accepts the operation input for the purpose of making the second lane change. Stated otherwise, in accordance with the operation input detected by the operation detection unit 60, the lane change control unit 64 permits the second lane change, namely, the lane change into the second lane 78R. The reason why such a second lane change is permitted is to make it possible for the vehicle to reach the destination, and further, because such a lane change does not result in energy being consumed needlessly.

The distance determination unit 84 is capable of determining the distance from the host vehicle 10 to a starting point (starting end) of a third lane 78D. The starting point of the third lane 78D, for example, is a location at which the sum of a width of the second lane 78R and a width of the third lane 78D starts to become larger than the width of the second lane 78R. The third lane 78D, as noted previously, is a branching lane that is located on the target route. The distance determination unit 84 is capable of determining the distance from the host vehicle 10 to the starting point of the third lane 78D, on the basis of the map information and the host vehicle position information.

A description will be given with reference to FIG. 3 concerning an example of operations performed in the case that the second lane 78R is a lane located on the target route, and the second lane 78R is located between the third lane 78D, which is a branching lane located on the target route, and the host vehicle lane 78C. In such a state, in the case it is determined by the remaining energy amount determination unit 58 that the remaining energy amount of the host vehicle 10 is less than the threshold value, the lane change control unit 64 can perform a control in the following manner. More specifically, in the case that the distance from the host vehicle 10 to the starting point of the third lane 78D is greater than or equal to the distance threshold value, the lane change control unit 64 does not accept the operation input for the purpose of making the second lane change. Stated otherwise, in accordance with the operation input detected by the operation detection unit 60, the lane change control unit 64 restricts the second lane change, namely, the lane change into the second lane 78R. Such a second lane change is restricted for the reasons mentioned below. More specifically, if the lane change into the second lane 78R is performed even though the distance from the host vehicle 10 to the starting point of the third lane 78D is greater than or equal to the distance threshold value, then taking into consideration a non-illustrated subsequent vehicle that is traveling at a high speed, it may become necessary to perform a lane change back into the host vehicle lane 78C. In the case that a lane change back into the host vehicle lane 78C is performed after having made a lane change into the second lane 78R, energy is consumed needlessly. In such a case, the second lane change is restricted in order to prevent such a needless consumption of energy. Further, in such a state, in the case it is determined by the remaining energy amount determination unit 58 that the remaining energy amount of the host vehicle 10 is less than the threshold value, the lane change control unit 64 performs a control in the following manner. More specifically, in the case that the distance from the host vehicle 10 to the starting point of the third lane 78D is less than the distance threshold value, the lane change control unit 64 accepts the operation input for the purpose of making the second lane change. Stated otherwise, in accordance with the operation input detected by the operation detection unit 60, the lane change control unit 64 permits the second lane change, namely, the lane change into the second lane 78R. The reason why the second lane change is permitted in the case that the distance from the host vehicle 10 to the starting point of the third lane 78D is less than the distance threshold value is in order to make it possible for the host vehicle to reach the destination. Further, in the case that the distance from the host vehicle 10 to the starting point of the third lane 78D is less than the distance threshold value, then after the lane change into the second lane 78R is performed, the possibility of it becoming necessary to make a lane change to return into the host vehicle lane 78C is low.

The lane change proposal unit 62 is capable of issuing the lane change proposal, and in particular, of issuing the lane change proposal to the user. The lane change proposal unit 62 issues the lane change proposal to the user using, for example, the HMI 22. More specifically, the lane change proposal unit 62 issues the lane change proposal to the user by way of voice. Such a voice message can be output using the speaker 46.

Moreover, in this instance, although an exemplary case has been described in which the lane change proposal is issued by way of voice, the present invention is not limited to this feature. For example, the lane change proposal may be issued by way of a display. Further, the lane change proposal may be issued by way of a combination of voice and display. Such a lane change proposal by way of a display can be issued using, for example, the display 40 or the like.

In the case that the lane change proposal is issued by the lane change proposal unit 62, using, for example, the operation input unit 68, the user may perform an indication of intention, which indicates whether or not the user agrees with the lane change proposal. For example, in the case that a lane change into the lane 78L located on the left side of the host vehicle lane 78C is proposed by the lane change proposal unit 62, if the user agrees with the lane change proposal, the user performs, for example, the first operation input. The first operation input can be performed, for example, by turning the operation input unit 68 counterclockwise; however, the present invention is not limited to this feature. Not performing the first operation input implies that the user disagrees with the lane change proposal. For example, in the case that a lane change into the lane 78R located on the right side of the host vehicle lane 78C is proposed by the lane change proposal unit 62, if the user agrees with the lane change proposal, the user performs, for example, the second operation input. The second operation input can be performed, for example, by turning the operation input unit 68 clockwise; however, the present invention is not limited to this feature. Not performing the second operation input implies that the user disagrees with the lane change proposal.

In the case that the second lane 78R is a lane located on the target route, the lane change proposal unit 62 issues a proposal to the user to make a lane change into the second lane 78R. Even in the case it is determined by the remaining energy amount determination unit 58 that the remaining energy amount is less than the threshold value, if the second lane 78R is a lane located on the target route, the lane change control unit 64 performs a control in the following manner.

More specifically, in such a case, on the basis of an operation input performed by the user in response to the lane change proposal issued by the lane change proposal unit 62 to make a lane change into the second lane 78R, the lane change control unit 64 permits the second lane change.

The storage unit 56 includes a non-illustrated volatile memory, and a non-illustrated nonvolatile memory. As an example of the volatile memory, there may be cited a RAM (Random Access Memory). As an example of the nonvolatile memory, there may be cited a ROM (Read Only Memory), a flash memory, or the like. The external environmental information, the vehicle body behavior information, and the vehicle operation information, etc., are stored, for example, in the volatile memory. Programs, tables, maps, and the like are stored, for example, in the nonvolatile memory.

Figure 4:
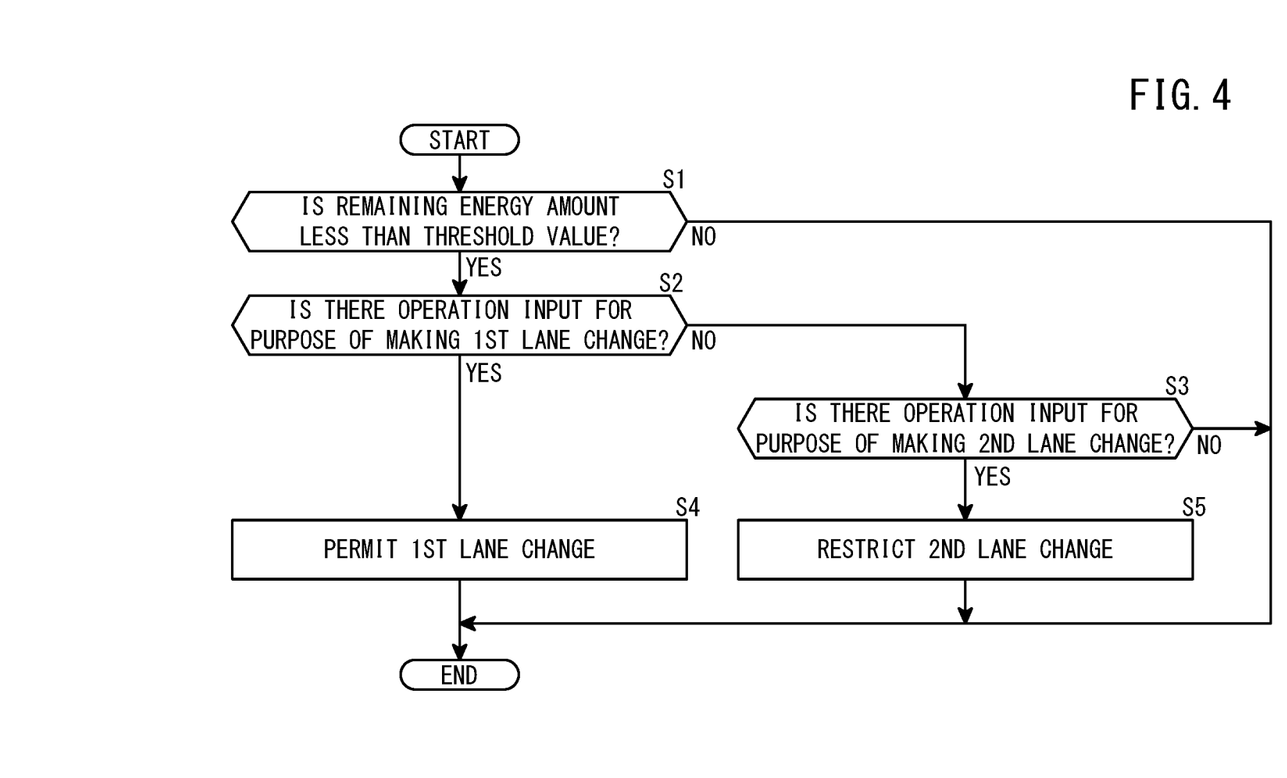
FIG. 4 is a flowchart showing an example of operations of the vehicle control device according to the embodiment.

FIG. 4 is a flowchart showing an example of operations of the vehicle control device according to the present embodiment. In this instance, a description will be given of a case in which the host vehicle 10 is traveling in the lane 78C.

In step S1, the remaining energy amount determination unit 58 determines whether or not the remaining energy amount of the host vehicle 10 is less than the threshold value. In the case that the remaining energy amount of the host vehicle 10 is less than the threshold value (YES in step S1), the process transitions to step S2. In the case that the remaining energy amount of the host vehicle 10 is greater than or equal to the threshold value (NO in step S1), the process shown in FIG. 4 is brought to an end.

In step S2, the operation detection unit 60 determines whether or not an operation input for the purpose of making the first lane change has been performed by the user. As noted previously, the first lane change, for example, is a lane change into the first lane 78L located between the evacuation area 80 and the host vehicle lane 78C. In the case that the operation input for the purpose of making the first lane change is performed by the user (YES in step S2), the process transitions to step S4. In the case that the operation input for the purpose of making the first lane change is not performed by the user (NO in step S2), the process transitions to step S3.

In step S3, the operation detection unit 60 determines whether or not an operation input for the purpose of making the second lane change has been performed by the user. As noted previously, the second lane change, for example, is a lane change into the second lane 78R that is not located between the evacuation area 80 and the host vehicle lane 78C. In the case that the operation input for the purpose of making the second lane change is performed by the user (YES in step S3), the process transitions to step S5. In the case that the operation input for the purpose of making the second lane change is not performed by the user (NO in step S3), the process shown in FIG. 4 is brought to an end.

In step S4, the lane change control unit 64 permits the first lane change. More specifically, the lane change control unit 64 executes the lane change into the first lane 78L located between the evacuation area 80 and the host vehicle lane 78C. The reason why the first lane change is permitted is because it becomes easy to enable evacuation of the host vehicle 10 into the evacuation area 80 when the remaining energy amount of the host vehicle 10 is about to become zero. Upon completion of step S4, the process shown in FIG. 4 is brought to an end.

In step S5, the lane change control unit 64 restricts the second lane change. More specifically, the lane change control unit 64, for example, does not execute the lane change into the second lane 78R that is not located between the evacuation area 80 and the host vehicle lane 78C. The reason why the second lane change is restricted is because, if the lane change into the second lane 78R were performed, it would become difficult for the host vehicle 10 to retreat into the evacuation area 80 when the remaining energy amount of the host vehicle 10 is about to become zero. Another reason why the second lane change is restricted is because a second lane change made in such a manner results in energy being consumed needlessly, which is not preferable from the standpoint of energy conservation. Upon completion of step S5, the process shown in FIG. 4 is brought to an end.

In this manner, in the case that the remaining energy amount is less than the threshold value, the lane change into the first lane 78L located between the evacuation area 80 and the host vehicle lane 78C is permitted. Therefore, in accordance with such a configuration, when the remaining energy amount of the host vehicle 10 is about to become zero, it becomes easy to satisfactorily enable evacuation of the host vehicle 10 into the evacuation area 80. Further, in the case that the remaining energy amount is less than the threshold value, the lane change into the second lane 78R that is not located between the evacuation area 80 and the host vehicle lane 78C is restricted. Therefore, in accordance with such a configuration, it is possible to prevent a situation in which it becomes difficult to enable evacuation of the host vehicle 10 into the evacuation area 80, together with preventing energy from being consumed needlessly.

Figure 5:
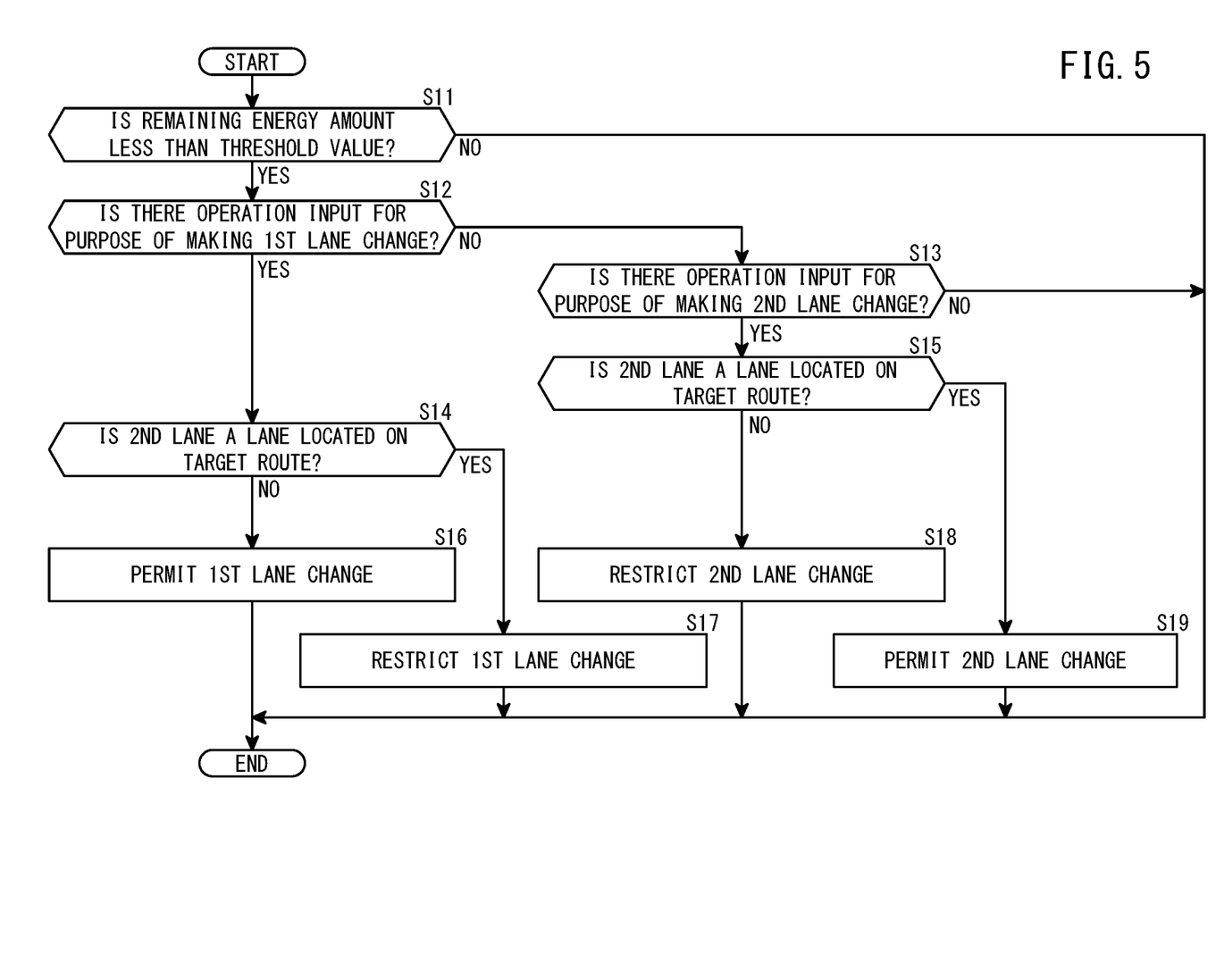
FIG. 5 is a flowchart illustrating an example of operations of the vehicle control device according to the embodiment.

FIG. 5 is a flowchart illustrating an example of operations of the vehicle control device according to the present embodiment. In this instance, a description will be given of a case in which the host vehicle 10 is traveling in the lane 78C.

In step S11, the remaining energy amount determination unit 58 determines whether or not the remaining energy amount of the host vehicle 10 is less than the threshold value. In the case that the remaining energy amount of the host vehicle 10 is less than the threshold value (YES in step S11), the process transitions to step S12. In the case that the remaining energy amount of the host vehicle 10 is greater than or equal to the threshold value (NO in step S11), the process shown in FIG. 5 is brought to an end.

In step S12, the operation detection unit 60 determines whether or not an operation input for the purpose of making the first lane change has been performed by the user. As noted previously, the first lane change, for example, is a lane change into the first lane 78L located between the evacuation area 80 and the host vehicle lane 78C. In the case that the operation input for the purpose of making the first lane change is performed by the user (YES in step S12), the process transitions to step S14. In the case that the operation input for the purpose of making the first lane change is not performed by the user (NO in step S12), the process transitions to step S13.

In step S13, the operation detection unit 60 determines whether or not an operation input for the purpose of making the second lane change has been performed by the user. As noted previously, the second lane change, for example, is a lane change into the second lane 78R that is not located between the evacuation area 80 and the host vehicle lane 78C. In the case that the operation input for the purpose of making the second lane change is performed by the user (YES in step S13), the process transitions to step S15. In the case that the operation input for the purpose of making the second lane change is not performed by the user (NO in step S13), the process shown in FIG. 5 is brought to an end.

In step S14, the lane change control unit 64 determines whether or not the second lane 78R is a lane located on the target route. If the second lane 78R is not a lane located on the target route (NO in step S14), the process transitions to step S16. If the second lane 78R is a lane located on the target route (YES in step S14), the process transitions to step S17.

In step S15, the lane change control unit 64 determines whether or not the second lane 78R is a lane located on the target route. If the second lane 78R is not a lane located on the target route (NO in step S15), the process transitions to step S18. If the second lane 78R is a lane located on the target route (YES in step S15), the process transitions to step S19.

In step S16, the lane change control unit 64 permits the first lane change. More specifically, the lane change control unit 64 executes the lane change into the first lane 78L located between the evacuation area 80 and the host vehicle lane 78C. The reason why the first lane change is permitted, as noted previously, is because it becomes easy to enable evacuation of the host vehicle 10 into the evacuation area 80 when the remaining energy amount of the host vehicle 10 is about to become zero. Upon completion of step S16, the process shown in FIG. 5 is brought to an end.

In step S17, the lane change control unit 64 restricts the first lane change. The lane change control unit 64 does not execute the lane change into the first lane 78L located between the evacuation area 80 and the host vehicle lane 78C. The reason why the first lane change is restricted is because, since the first lane 78L is not a lane located on the target route, energy would be consumed needlessly, which is not preferable from the standpoint of energy conservation. Upon completion of step S17, the process shown in FIG. 5 is brought to an end.

In step S18, the lane change control unit 64 restricts the second lane change. More specifically, the lane change control unit 64, for example, does not execute the lane change into the second lane 78R that is not located between the evacuation area 80 and the host vehicle lane 78C. The reason why the second lane change is restricted is because, if the lane change into the second lane 78R were performed, it would become difficult for the host vehicle 10 to retreat into the evacuation area 80 when the remaining energy amount of the host vehicle 10 is about to become zero. Another reason why the second lane change is restricted is because a second lane change made in such a manner results in energy being consumed needlessly, which is not preferable from the standpoint of energy conservation.

In step S19, the lane change control unit 64 permits the second lane change. More specifically, the lane change control unit 64 executes the lane change into the second lane 78R that is not located between the evacuation area 80 and the host vehicle lane 78C. The reason why the second lane change is permitted is to make it possible for the vehicle to reach the destination, and further, because such a lane change for the purpose of reaching the destination does not result in energy being consumed needlessly.

In the foregoing manner, in the case that the second lane 78R is a lane located on the target route, the lane change into the second lane 78R is permitted, even if the remaining energy amount of the host vehicle 10 is less than the threshold value. Therefore, in accordance with such a configuration, it is possible to enable the host vehicle 10 to reach the destination. Further, in the case that the second lane 78R is a lane located on the target route, and the remaining energy amount of the host vehicle 10 is less than the threshold value, the lane change into the first lane 78L is restricted. Therefore, in accordance with such a configuration, needless consumption of energy can be prevented.

Figure 6:
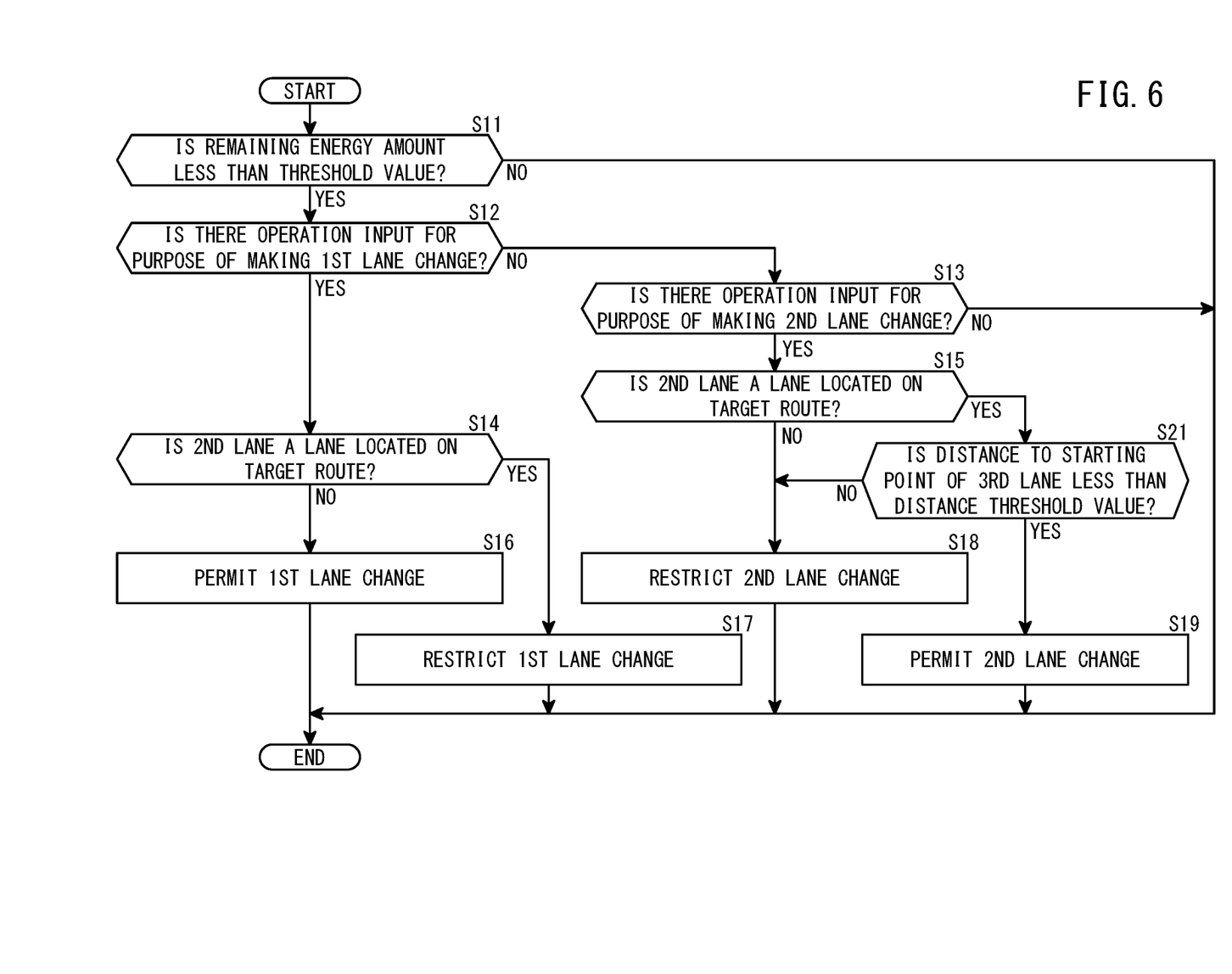
FIG. 6 is a flowchart showing an example of operations of the vehicle control device according to the embodiment.

FIG. 6 is a flowchart showing an example of operations of the vehicle control device according to the present embodiment. In this instance, a description will be given of a case in which the host vehicle 10 is traveling in the lane 78C.

Steps S11 to S14 are the same as steps S11 to S14 described above with reference to FIG. 5, and therefore, description of these steps is omitted.

In step S15, the lane change control unit 64 determines whether or not the second lane 78R is a lane located on the target route. If the second lane 78R is not a lane located on the target route (NO in step S15), the process transitions to step S18. If the second lane 78R is a lane located on the target route (YES in step S15), the process transitions to step S21.

Steps S16 and S17 are the same as steps S16 and S17 described above with reference to FIG. 5, and therefore, description of these steps is omitted.

In step S21, the distance determination unit 84 determines whether or not the distance from the host vehicle 10 to the starting point of the third lane 78D is less than the distance threshold value. If the distance from the host vehicle 10 to the starting point of the third lane 78D is greater than or equal to the distance threshold value (NO in step S21), the process transitions to step S18. If the distance from the host vehicle 10 to the starting point of the third lane 78D is less than the distance threshold value (YES in step S21), the process transitions to step S19.

Steps S18 and S19 are the same as steps S18 and S19 described above with reference to FIG. 5, and therefore, description of these steps is omitted.

In this manner, when the second lane 78R is a lane located on the target route, the distance from the host vehicle 10 to the starting point of the third lane 78D is greater than or equal to the distance threshold value, and the remaining energy amount is less than the threshold value, the lane change into the second lane 78R is restricted. Therefore, in accordance with such a configuration, needless consumption of energy can be prevented. Further, when the second lane 78R is a lane located on the target route, the distance from the host vehicle 10 to the starting point of the third lane 78D is less than the distance threshold value, and the remaining energy amount is less than the threshold value, the lane change into the second lane 78R is permitted. Therefore, in accordance with such a configuration, it is possible to enable the host vehicle 10 to reach the destination while preventing energy from being consumed needlessly.

Figure 7:
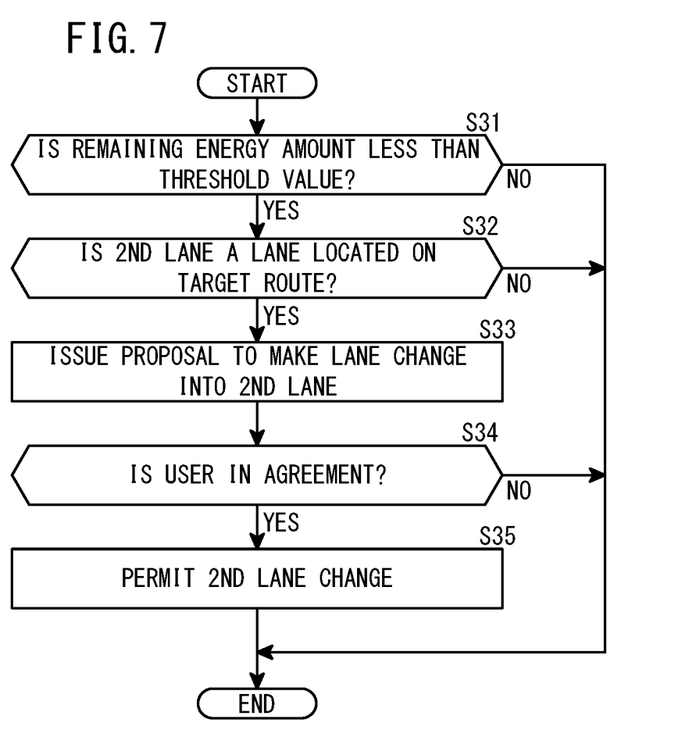
FIG. 7 is a flowchart illustrating an example of operations of the vehicle control device according to the embodiment.

FIG. 7 is a flowchart illustrating an example of operations of the vehicle control device according to the present embodiment. In this instance, a description will be given of a case in which the host vehicle 10 is traveling in the lane 78C.

In step S31, the remaining energy amount determination unit 58 determines whether or not the remaining energy amount of the host vehicle 10 is less than the threshold value. In the case that the remaining energy amount of the host vehicle 10 is greater than or equal to the threshold value (NO in step S31), the process shown in FIG. 7 is brought to an end. In the case that the remaining energy amount of the host vehicle 10 is less than the threshold value (YES in step S31), the process transitions to step S32.

In step S32, the lane change control unit 64 determines whether or not the second lane 78R is a lane located on the target route. If the second lane 78R is a lane located on the target route (YES in step S32), the process transitions to step S33. If the second lane 78R is not a lane located on the target route (NO in step S32), the process shown in FIG. 7 is brought to an end.

In step S33, the lane change proposal unit 62 issues a lane change proposal. More specifically, the lane change proposal unit 62 issues a proposal to the user to make a lane change into the second lane 78R. Thereafter, the process transitions to step S34.

In step S34, the lane change proposal unit 62 determines whether or not the user is in agreement with the lane change proposal on the basis of the operation input performed by the user. The operation input performed by the user can be detected by the operation detection unit 60. In the case that the user is in agreement with the lane change proposal issued by the lane change proposal unit 62 (YES in step S34), the process transitions to step S35. In the case that the user is not in agreement with the lane change proposal issued by the lane change proposal unit 62 (NO in step S34), the process shown in FIG. 7 is brought to an end.

In step S35, the lane change control unit 64 permits the second lane change, namely, the lane change into the second lane 78R. Stated otherwise, the lane change control unit 64 executes the lane change into the second lane 78R. Upon completion of the above steps, the process shown in FIG. 7 is brought to an end.

In the foregoing manner, even in the case that the remaining energy amount is less than the threshold value, if the second lane 78R is a lane that is located on the target route, the lane change control unit 64 performs a control in the following manner. More specifically, on the basis of the operation input performed by the user in response to the lane change proposal issued by the lane change proposal unit 62 to make a lane change into the second lane 78R, the lane change into the second lane 78R is permitted. Therefore, in accordance with such a configuration, it is possible to enable the host vehicle 10 to reach the destination.

Modified Embodiments

Although preferred embodiments of the present invention have been described above, the present invention is not limited to the above-described embodiments, and various modifications can be made thereto without departing from the essence and scope of the present invention.

For example, the lane change control unit 64 may be capable of executing a first lane change control that controls the lane change based on an operation performed by the user, and a second lane change control that controls the lane change without being based on an operation input performed by the user.

Summarizing the above-described embodiments, the characteristic features described below are realized.

The vehicle control device (12) comprises the remaining energy amount determination unit (58) that determines the remaining energy amount of the host vehicle (10), and the lane change control unit (64) that controls the lane change on the basis of the remaining energy amount determined by the remaining energy amount determination unit, wherein, in the case that the remaining energy amount is determined by the remaining energy amount determination unit to be less than the threshold value, the lane change control unit permits the first lane change, which is a lane change into the first lane (78L) located on one side of a host vehicle lane (78C), which is a lane in which the host vehicle travels, and restricts the second lane change, which is a lane change into the second lane (78R) located on the other side of the host vehicle lane. In accordance with such a configuration, the first lane change, which is the lane change into the first lane located on the one side of the host vehicle lane, is permitted. Therefore, when the remaining energy amount of the host vehicle is about to become zero, it becomes easy to satisfactorily enable evacuation of the host vehicle. Further, in accordance with such a configuration, the second lane change, which is the lane change into the second lane located on the other side of the host vehicle lane, is restricted. Therefore, when the remaining energy amount is about to become zero, it is possible to prevent a situation in which it becomes difficult to enable evacuation of the host vehicle, together with preventing energy from being consumed needlessly.

The first lane may be located between the host vehicle lane and the evacuation area (80) into which the host vehicle can retreat, and the second lane may not be located between the evacuation area and the host vehicle lane. In accordance with such a configuration, the first lane change, which is the lane change into the first lane located between the evacuation area and the host vehicle lane, is permitted. Therefore, when the remaining energy amount of the host vehicle is about to become zero, it becomes easy to satisfactorily enable evacuation of the host vehicle into the evacuation area. Further, in accordance with such a configuration, the second lane change, which is the lane change into the second lane that is not located between the evacuation area and the host vehicle lane, is restricted. Therefore, when the remaining energy amount is about to become zero, it is possible to prevent a situation in which it becomes difficult to enable evacuation of the host vehicle into the evacuation area, together with preventing energy from being consumed needlessly.

There may further be provided the operation detection unit (60) that detects the operation input performed by the user, wherein, in the case that the remaining energy amount is determined by the remaining energy amount determination unit to be less than the threshold value, the lane change control unit may be configured so as to accept the operation input for the purpose of making the first lane change, and may be configured so as not to accept the operation input for the purpose of making the second lane change.

Even in the case that the remaining energy amount is determined by the remaining energy amount determination unit to be less than the threshold value, when the second lane is a lane located on the target route that is determined in advance by the target route determination unit, the lane change control unit may be configured to accept the operation input for the purpose of making the second lane change, and may be configured so as not to accept the operation input for the purpose of making the first lane change. In accordance with such a configuration, it is possible to enable the host vehicle to reach the destination.

In the case that the second lane is a lane located on the target route, the second lane is located between the third lane (78D), which is a branching lane located on the target route, and the host vehicle lane, the distance from the host vehicle to the starting point of the third lane is greater than or equal to the distance threshold value, and the remaining energy amount is determined by the remaining energy amount determination unit to be less than the threshold value, the lane change control unit may not accept the operation input for the purpose of making the second lane change, whereas in the case that the second lane is the lane located on the target route, the second lane is located between the third lane, which is the branching lane located on the target route, and the host vehicle lane, the distance from the host vehicle to the starting point of the third lane is less than the distance threshold value, and the remaining energy amount is determined by the remaining energy amount determination unit to be less than the threshold value, the lane change control unit may accept the operation input for the purpose of making the second lane change. In the case that the lane change into the second lane is performed even though the distance from the host vehicle to the starting point of the third lane is greater than or equal to the distance threshold value, then taking into consideration a non-illustrated subsequent vehicle that is traveling at a high speed, it may become necessary to perform a lane change back into the host vehicle lane. In the case that a lane change back into the host vehicle lane is performed after having made a lane change into the second lane, energy is consumed needlessly. In accordance with such a configuration, in the case that the distance from the host vehicle to the starting point of the third lane is greater than or equal to the distance threshold value, even if the second lane and the third lane are lanes located on the target route, and the remaining energy amount is less than the threshold value, the lane change into the second lane is restricted. Therefore, in accordance with such a configuration, needless consumption of energy can be prevented. In the case that the distance from the host vehicle to the starting point of the third lane is less than the distance threshold value, then after the lane change into the second lane is performed, the possibility of it becoming necessary to make a lane change to return into the host vehicle lane is low. In accordance with such a configuration, in the case that the distance from the host vehicle to the starting point of the third lane is less than the distance threshold value, the second lane and the third lane are lanes located on the target route, and the remaining energy amount is less than the threshold value, then the lane change into the second lane is permitted. Therefore, in accordance with such a configuration, it is possible to enable the host vehicle to reach the destination while preventing needless consumption of energy.

There may further be provided the lane change proposal unit (62) that issues a proposal to make the lane change to the user, and the operation detection unit that detects the operation input performed by the user in response to the proposal to make the lane change issued by the lane change proposal unit, wherein, when the second lane is the lane located on the target route that is determined in advance by the target route determination unit, the lane change proposal unit may be configured to issue a proposal to the user to make the lane change into the second lane, and even in the case that the remaining energy amount is determined by the remaining energy amount determination unit to be less than the threshold value, when the second lane is the lane located on the target route, the lane change control unit may be configured to accept the operation input performed by the user for the purpose of making the second lane change in response to the proposal issued by the lane change proposal unit to make the lane change into the second lane. In accordance with such a configuration, according to the lane change proposal issued by the lane change proposal unit, the host vehicle can be made to reach the destination.

The lane change control unit may be capable of executing the first lane change control that controls the lane change based on an operation performed by the user, and the second lane change control that controls the lane change without being based on an operation input performed by the user.

The vehicle (10) comprises the vehicle control device as described above.

The vehicle control method comprises the step (step S1) of determining the remaining energy amount of the host vehicle, and the step (step S4, step S5) of controlling the lane change on the basis of the remaining energy amount, wherein, in the case it is determined in the step of determining the remaining energy amount that the remaining energy amount is less than the threshold value, then in the step of controlling the lane change, the first lane change, which is the lane change into the first lane located on the one side of the host vehicle lane, which is a lane in which the host vehicle travels, is permitted (step S4), and the second lane change, which is the lane change into the second lane located on the other side of the host vehicle lane, is restricted (step S5).

What is claimed is:

1. A vehicle control device, comprising:
    a remaining energy amount determination unit configured to determine a remaining energy amount of a host vehicle;
    a lane change control unit configured to control a lane change on a basis of the remaining energy amount determined by the remaining energy amount determination unit; and
    an operation detection unit configured to detect an operation input performed by a user,
    wherein, in a case that the remaining energy amount is determined by the remaining energy amount determination unit to be less than a threshold value, when a second lane located on one side of a host vehicle lane, which is a lane in which the host vehicle travels, is not a lane located on a target route that is determined in advance by a target route determination unit, the lane change control unit accepts the operation input for a purpose of making a first lane change, which is the lane change into a first lane located on another side of the host vehicle lane, and does not accept the operation input for a purpose of making a second lane change, which is the lane change into the second lane and when the second lane is a lane located on the target route, the lane change control unit accepts the operation input for a purpose of making the second lane change, and does not accept the operation input for a purpose of making the first lane change.

2. The vehicle control device according to claim 1, wherein:
    the first lane is located between the host vehicle lane and an evacuation area into which the host vehicle is configured to retreat; and
    the second lane is not located between the evacuation area and the host vehicle lane.

3. The vehicle control device according to claim 1, wherein:
    in a case that the second lane is a lane located on the target route, the second lane is located between a third lane, which is a branching lane located on the target route, and the host vehicle lane, a distance from the host vehicle to a starting point of the third lane is greater than or equal to a distance threshold value, and the remaining energy amount is determined by the remaining energy amount determination unit to be less than the threshold value, the lane change control unit does not accept the operation input for the purpose of making the second lane change; and
    in the case that the second lane is the lane located on the target route, the second lane is located between the third lane, which is the branching lane located on the target route, and the host vehicle lane, the distance from the host vehicle to the starting point of the third lane is less than the distance threshold value, and the remaining energy amount is determined by the remaining energy amount determination unit to be less than the threshold value, the lane change control unit accepts the operation input for the purpose of making the second lane change.

4. The vehicle control device according to claim 1, further comprising:
  a lane change proposal unit configured to issue a proposal to make the lane change to the user, wherein
  the operation detection unit detects the operation input performed by the user in response to the proposal to make the lane change issued by the lane change proposal unit,
  wherein, when the second lane is the lane located on the target route that is determined in advance by the target route determination unit, the lane change proposal unit issues a proposal to the user to make the lane change into the second lane, and
  even in the case that the remaining energy amount is determined by the remaining energy amount determination unit to be less than the threshold value, when the second lane is the lane located on the target route, the lane change control unit accepts the operation input performed by the user for a purpose of making the second lane change in response to the proposal issued by the lane change proposal unit to make the lane change into the second lane.

5. The vehicle control device according to claim 1, wherein the lane change control unit is configured to execute a first lane change control that controls the lane change based on an operation performed by the user, and a second lane change control that controls the lane change without being based on the operation performed by the user.

6. A vehicle comprising a vehicle control device, the vehicle control device comprising:
  a remaining energy amount determination unit configured to determine a remaining energy amount of a host vehicle;
  a lane change control unit configured to control a lane change on a basis of the remaining energy amount determined by the remaining energy amount determination unit; and
  an operation detection unit configured to detect an operation input performed by a user,
  wherein, in a case that the remaining energy amount is determined by the remaining energy amount determination unit to be less than a threshold value, when a second lane located on one side of a host vehicle lane, which is a lane in which the host vehicle travels, is not a lane located on a target route that is determined in advance by a target route determination unit, the lane change control unit accepts the operation input for a purpose of making a first lane change, which is the lane change into a first lane located on another side of the host vehicle lane, and does not accept the operation input for a purpose of making a second lane change, which is the lane change into the second lane and when the second lane is a lane located on the target route, the lane change control unit accepts the operation input for a purpose of making the second lane change and does not accept the operation input for a purpose of making the first lane change.

7. A vehicle control method, comprising:
a step of determining a remaining energy amount of a host vehicle;
a step of controlling a lane change on a basis of the remaining energy amount; and
a step of detecting an operation input performed by a user,
  wherein, in a case it is determined in the step of determining the remaining energy amount that the remaining energy amount is less than a threshold value, then in the step of controlling the lane change, when a second lane located on one side of a host vehicle lane, which is a lane in which the host vehicle travels, is not a lane located on a target route that is determined in advance, the operation input for a purpose of making a first lane change, which is the lane change into a first lane located on another side of the host vehicle lane is accepted, and the operation input for a purpose of making a second lane change, which is the lane change into the second lane, is not accepted, and when the second lane is a lane located on the target route, the operation input for a purpose of making the second lane change is accepted, and the operation input for a purpose of making the first lane change is not accepted.

* * * * *